United States Patent
Vaca Torres et al.

(10) Patent No.: US 11,906,327 B2
(45) Date of Patent: Feb. 20, 2024

(54) SENSOR HOLDER FOR A FLOW SENSOR AND METHOD FOR MAINTENANCE

(71) Applicant: Endress+Hauser Conducta GmbH+Co. KG, Gerlingen (DE)

(72) Inventors: Alejandro Vaca Torres, Steinheim (DE); Michael Wiederkehr, Leonberg (DE); Andreas Müller, Ostfildern (DE); Ralf Bernhard, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 132 days.

(21) Appl. No.: 17/658,460

(22) Filed: Apr. 8, 2022

(65) Prior Publication Data
US 2022/0333960 A1 Oct. 20, 2022

(30) Foreign Application Priority Data
Apr. 14, 2021 (DE) ...................... 10 2021 109 406.2

(51) Int. Cl.
*B08B 5/02* (2006.01)
*G01D 11/24* (2006.01)

(52) U.S. Cl.
CPC .............. *G01D 11/245* (2013.01); *B08B 5/02* (2013.01)

(58) Field of Classification Search
CPC .................................. G01D 11/245; B08B 5/02
See application file for complete search history.

(56) References Cited

FOREIGN PATENT DOCUMENTS

| DE | 1798002 | A1 | | 9/1971 | |
|---|---|---|---|---|---|
| DE | 19906632 | A1 | * | 9/2000 | ............. G01F 1/684 |
| DE | 19937332 | A1 | * | 3/2001 | ............. F16L 19/062 |
| DE | 102009045095 | A1 | * | 4/2011 | ............. A61M 1/14 |
| DE | 102009045095 | A1 | | 4/2011 | |
| DE | 102017103512 | A1 | * | 5/2018 | |
| DE | 102017116269 | A1 | * | 1/2019 | ............. B60R 5/047 |
| DE | 102017116269 | A1 | | 1/2019 | |
| DE | 102017128888 | A1 | * | 6/2019 | |
| DE | 102017128888 | A1 | | 6/2019 | |
| DE | 202019102063 | U1 | | 7/2020 | |
| DE | 202019102063 | U1 | * | 8/2020 | |

OTHER PUBLICATIONS

Wikipedia, Scharnier, https://de.wikipedia.org/w/index.php?title=Scharnier&oldid=210586441, 10 pp. (last accessed Jan. 10, 2022) (English Translation Provided).

* cited by examiner

*Primary Examiner* — Jamel E Williams
(74) *Attorney, Agent, or Firm* — Kelly J. Smith; Endress+Hauser (USA) Holding, Inc.

(57) ABSTRACT

The present disclosure discloses a sensor holder for a flow sensor, comprising a substantially cylindrical housing with a housing interior with an opening at a first front face. The opening is designed to receive the flow sensor. The housing at the second front face, which is opposite the first front face, is conical. A first flushing opens to the housing interior, where the opening opens into the end region of the cone, and a second flushing opens to the housing interior. A fastening unit is designed to fasten the flow sensor in the housing, and a first wall holder is designed to be fastened to a wall. The first wall holder comprises a joint in the region of the second front face, with the joint connecting to the housing. The housing can be moved via the joint from a measurement position into a maintenance position.

12 Claims, 8 Drawing Sheets

SENSOR HOLDER FOR A FLOW SENSOR AND METHOD FOR MAINTENANCE

CROSS-REFERENCE TO RELATED APPLICATION

The present application is related to and claims the priority benefit of German Patent Application No. 10 2021 109 406.2, filed on Apr. 14, 2021, the entire contents of which are incorporated herein by reference.

TECHNICAL FIELD

The present disclosure relates to a sensor holder for a flow sensor and to a method for the maintenance thereof.

BACKGROUND

Sensors for liquid analysis are frequently designed as immersion sensors for application in open basins. On the other hand, for processes in which the medium is under pressure in pipe conduits, there are flow vessels. The sensor then measures in the flow and is accordingly referred to as a flow sensor.

The sensors and the flow vessel can become soiled during operation. For cleaning the sensitive region of the sensor, the flow vessels frequently have a cleaning nozzle. Automatic cleaning with compressed air or a liquid cleaning medium is thus possible. Due to the process medium and air cleaning, air bubbles can interfere with the measurement, or larger amounts of air can accumulate in the flow vessel. For removing stubborn soiling, the disassembly of the sensor must be as easy as possible. In this respect, it must be taken into account that the unit consisting of the flow vessel and the sensor is often mounted in a protective cabinet with very restricted space conditions.

SUMMARY

The present disclosure is based upon the aim of enabling the easy maintainability of flow vessels under restricted space conditions, wherein the flow vessel should also be suitable for bubble-free measurement.

The aim is achieved by a sensor holder for a flow sensor, comprising a substantially cylindrical housing with a housing interior with an opening at a first front face, which is designed to receive the flow sensor, wherein the housing at the second front face, which is the front face opposite the first front face, is conical. A first flushing opens to the housing interior, which opening opens into the end region of the cone. A second flushing opens to the housing interior. A fastening unit is designed to fasten the flow sensor in the housing, and a first wall holder is designed to be fastened to a wall. The first wall holder comprises, in the region of the second front face, a joint connected to the housing, wherein the housing can be moved via the joint from a measurement position to a maintenance position.

Thus, easy disassembly of the sensor under restricted space conditions is made possible, while ensuring compressive strength. This results in easy maintenance with easy cleaning predominantly of the interior, and in the easy possibility of exchanging or cleaning the seal.

In this case, the material, the surface quality, and contour of the sensor holder are selected such that the liquid volume is as small as possible, and the measured variable is not influenced by wall effects. The design should also counteract the accumulation of dirt as much as possible.

One embodiment provides that the sensor holder comprise a second wall holder, which is designed to be fastened to a wall; the second wall holder is arranged at an offset from the first wall holder, wherein the second wall holder comprises a receptacle for the flow sensor.

One embodiment provides that the first wall holder comprise a buffer, which brakes a movement of the housing from the measurement position into the maintenance position.

One embodiment provides that the first wall holder with the joint, with the second wall holder, be designed such that the longitudinal axis of the housing is arranged at an angle of $\geq 5°$, such as between $5°$ and $45°$, and such as between $5°$ and $20°$ to the vertical.

One embodiment provides that the sensor holder comprise a cleaning opening to the housing interior, which opening is arranged such that it is directed onto the sensitive region of the flow sensor in the installed state thereof.

One embodiment provides that the fastening unit be a union nut, and the housing have a corresponding external thread in the region of the first front face.

One embodiment provides that the sensor holder comprise a holding piece, such as an annular holding piece, which is designed to be fixed to or around the flow sensor, wherein the holding piece is designed to be attached to the housing at the first front face, wherein the fastening unit engages in the holding piece and prevents a movement of the flow sensor installed in the sensor holder.

One embodiment provides that the holding piece comprise a collar, wherein the union nut is supported on the collar, thereby pressing the holding piece onto the housing and preventing a movement of the flow sensor.

One embodiment provides that the sensor holder comprise a sealing element, which is designed to prevent a flow of medium from the housing interior to the outside, wherein the housing has a groove in the region of the first front face, into which groove the sealing element can be inserted.

One embodiment provides that the sealing element be annular and comprise a first O-ring on its inner side and a second O-ring on its outer side.

One embodiment provides that the flow sensor be an optical sensor, such as, a fluorescence sensor for determining the oil-in-water content, turbidity sensor, oxygen sensor.

The aim is furthermore achieved by a method for maintaining a flow sensor in a sensor holder as described above, comprising at least the following steps: moving the housing via the joint from the measurement position into the maintenance position; releasing the fastening unit, including or not including the union nut; removing the holding piece with the flow sensor attached thereto from the housing interior; removing the sealing element; optionally, cleaning or replacing the sealing element; cleaning the housing interior, and cleaning the first and/or second flushing opening and/or cleaning opening if necessary; optionally, cleaning the holding piece and cleaning the flow sensor; attaching the sealing element; attaching the holding piece together with the flow sensor; attaching the fastening unit; and moving the housing into the measurement position.

The claimed sensor holder and the claimed method result in a minimum volume of the flow cell without influencing the measurement signal, which enables the easiest maintenance under restricted space conditions and enables effective prevention of measurement errors due to air bubbles, with simultaneously fast availability of the measurement after compressed-air cleaning.

BRIEF DESCRIPTION OF THE DRAWINGS

This is explained in more detail with reference to the following figures.

In the figures, the same features are identified by the same reference signs.

DETAILED DESCRIPTION

Figure 1:
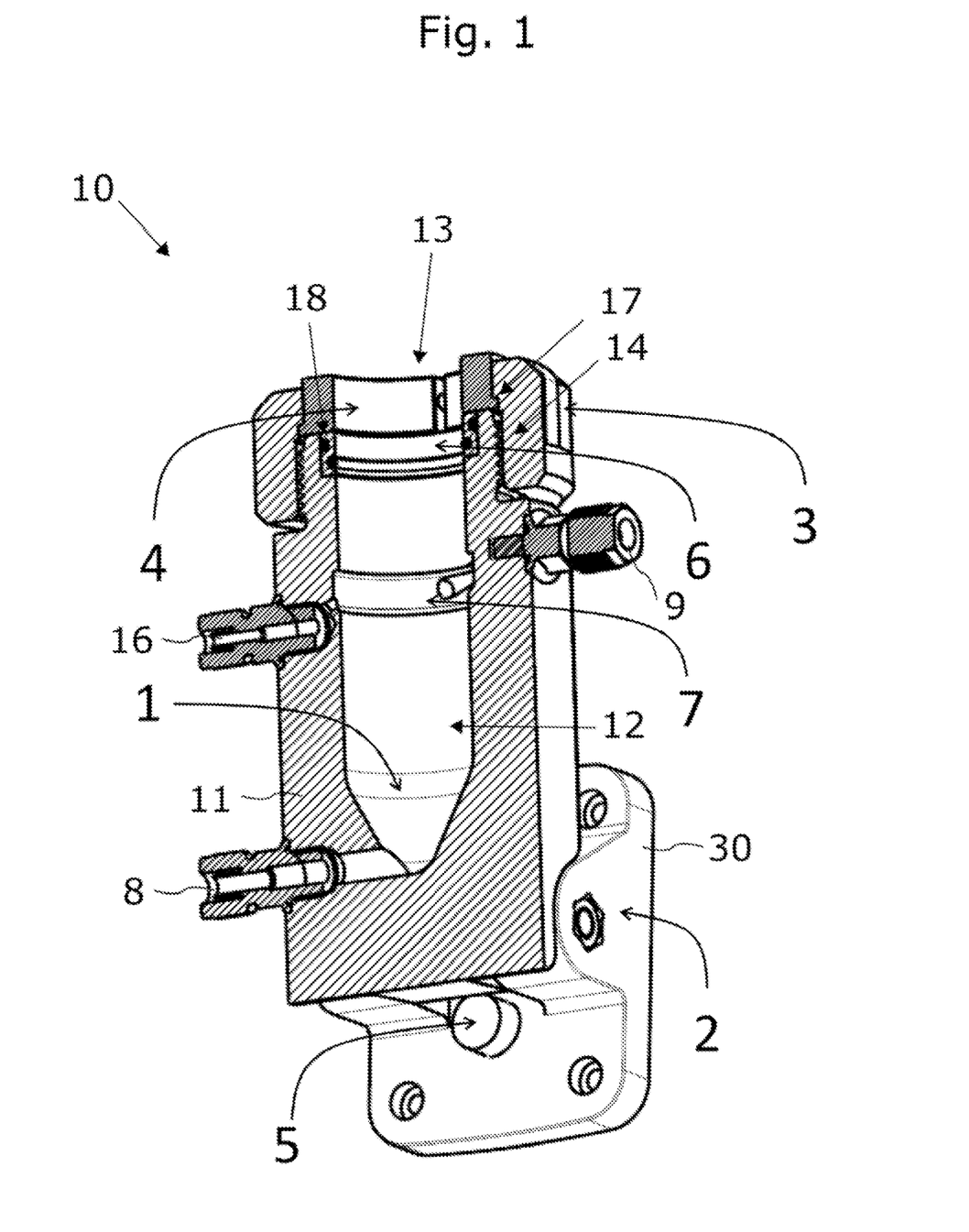
FIG. 1 shows the claimed sensor holder in cross-section.

The claimed sensor holder in its entirety is denoted by reference sign 10 and is shown in FIG. 1 in cross-section without sensor 20.

The sensor holder 10 comprises a substantially cylindrical housing 11 with a housing interior 12. On a first side, in FIG. 1 at the top, the holder 10 has an opening 13 to the interior 12, into which opening the flow sensor 20 can be inserted. The housing 11 is conical on the opposite side. This is denoted by reference sign 1. The conical design prevents light reflections and avoids the accumulation of dirt.

The housing 11 comprises a first flushing opening 8 to the housing interior 12, which opening opens into the end region of the cone 1, and a second flushing opening 9. Through the first flushing opening, flushing/calibrating or cleaning medium is introduced into the interior 12, and the medium leaves the interior 12 again through the second flushing opening.

The sensor holder 10 comprises a fastening unit 3, which is designed to fasten the flow sensor 10 in the housing 11. The fastening unit is, for example, a union nut 3, wherein the housing 11 has, in the region of the first front face 13, an external thread 14 corresponding to the union nut. In one embodiment, the fastening unit 3 comprises one or more radial openings, e.g., as threads, through which one or more screws can be guided, wherein corresponding openings, e.g., threads, are arranged in the housing 11. Likewise, the radially inner holding piece 4 (see below) can have corresponding openings, e.g., threads. The sensor 20 can also have corresponding receiving means. The sensor can thus be fixed in/on the housing.

A holding piece 4, such as an annular holding piece, is designed to be fixed to or around the flow sensor 20. For this purpose, the sensor 20 comprises markings 21, such as, markings applied at the factory, so that the user knows exactly at what location the holding piece 4 must be attached to the sensor 20; see FIG. 4. The marking 21 is applied to the sensor 20, e.g., by means of laser marking or imprinted, such that the sensor 20 thus accordingly arranged comes to lie in the sensor holder 10 with its sensitive region 22 at the level of the cleaning opening 16 by means of the holding piece 4. For this purpose, the holding piece 4 is designed such that it can be attached to the housing 11 at the first front face 13. The fastening unit 3, i.e., for example, the union nut, engages in the holding piece 4, thereby preventing a movement of the flow sensor 20 installed in the sensor holder.

Via the cleaning opening 16, compressed air can be introduced onto the sensitive region 23 of the sensor 20 in order to remove any residues present. The cleaning opening 16 has a nozzle shape with a suitable orientation (i.e., with a corresponding angle), in order to effectively remove contamination of the central sensor window.

Figure 6:
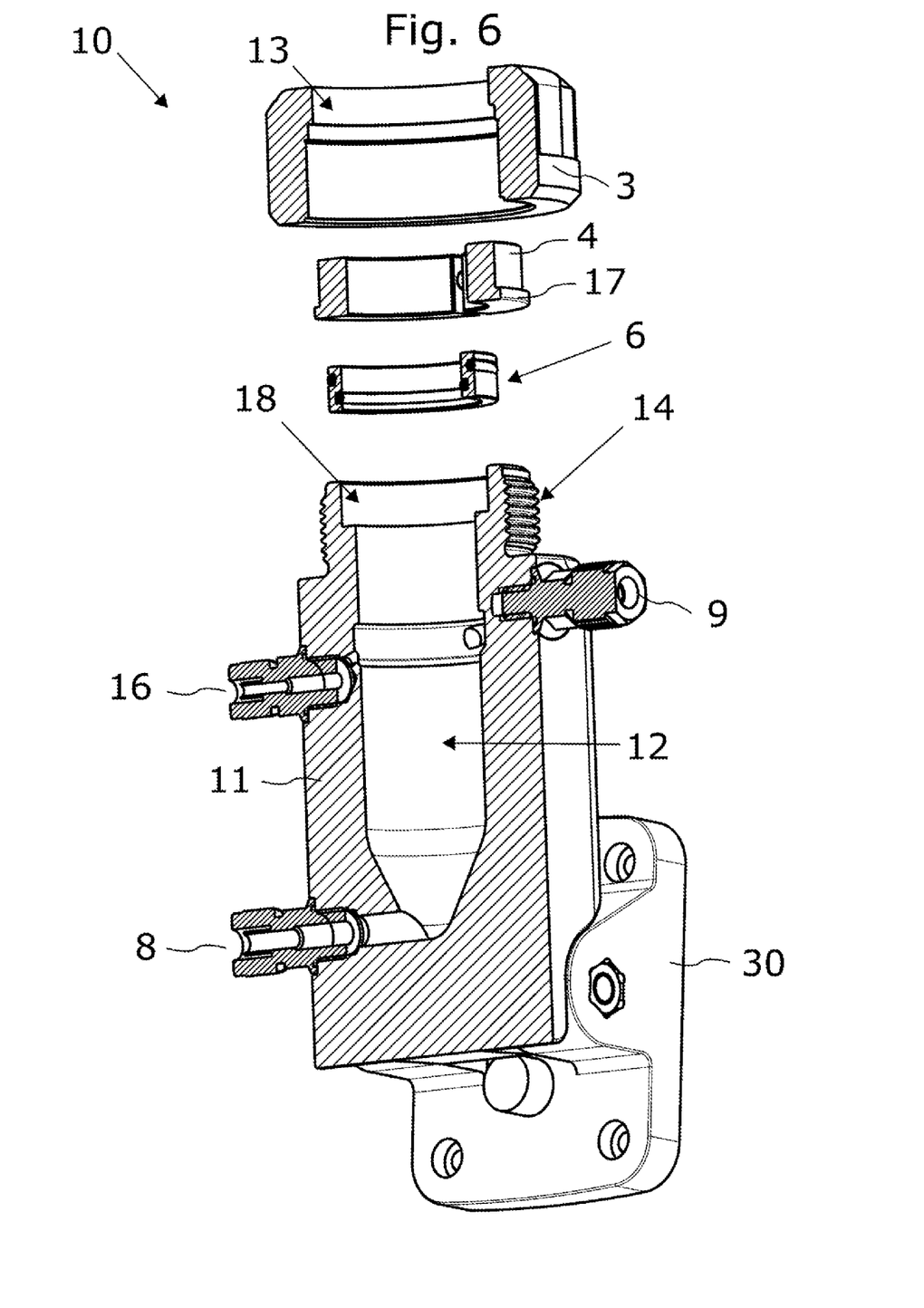
FIG. 6 shows the claimed sensor holder in an exploded view in cross-section.

The holding piece 4 comprises a collar 17, wherein the union nut 3 is supported on the collar 17, thereby pressing the holding piece 4 onto the housing 11 and preventing a movement of the flow sensor 20. FIG. 6 shows an exploded view. The collar 17 of the holding piece 4 can be seen therein. The union nut 3 comprises a corresponding mating part as a kind of overhang or with a smaller inner diameter.

Figure 7:
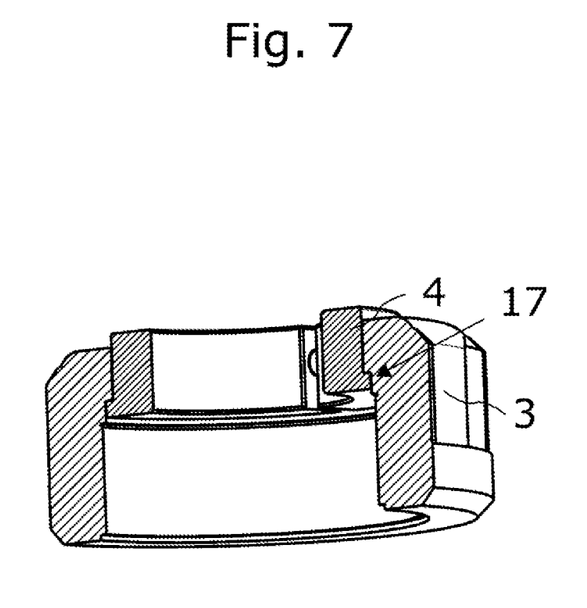
FIG. 7 shows the holding piece in the fastening unit.

FIG. 7 shows the union nut 3 and the holding piece in an isolated view, but in the assembled state.

Figure 8:
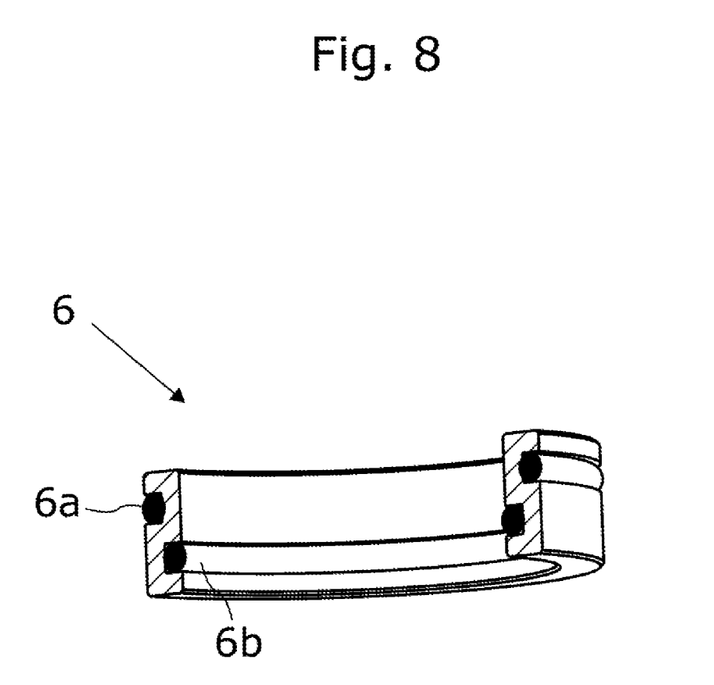
FIG. 8 shows the sealing element.

In the region of the first front face 13, the housing 11 has a groove 18, into which a sealing element 6 can be inserted. The groove 18 directly adjoins the upper edge (i.e., on the side of the opening 13) of the housing 11. The sealing element 6 is designed to prevent a flow of medium from the housing interior 12 to the outside. The sealing element 6 can be designed as an O-ring or sealing tape. In one embodiment, which is shown in FIG. 1, the sealing element 6 is annular, e.g., made of a plastic or metal. In this case, the sealing element 6 has both a circumferential groove on the inner side and a circumferential groove on the outer side, into each of which an O-ring 6a, 6b is inserted. For maintenance of the sensor 20, the complete sealing element 6 can now be replaced, or only one or both O-rings can be exchanged, as required. Sealing with the double sealing ring 6 enables easy cleaning and seal replacement. FIG. 8 shows the sealing element 6 in an isolated view; FIG. 6 shows it as part of the exploded view.

In the lower region, i.e., on the side of the cone 1, the sensor holder 10 comprises a first wall holder 30, which is designed to be fastened to a wall 42. The first wall holder 30 in this case comprises a joint 2, e.g., a hinge, which is connected to the housing 11, wherein the housing 11 can be moved via the joint 2 from a measurement position into a maintenance position. The first wall holder 30 with the joint 2, and with the second wall holder 31 (see below), is designed such that the longitudinal axis of the housing 11 is arranged at an angle of ≥5°, between 5° and 45° and/or between 5° and 20°, to the vertical, i.e., to the wall 42. The slightly inclined sensor assembly and the annular bubble trap 7 prevent the accumulation of air or air bubbles. In the bubble trap 7, the air can accumulate in this ring without impairing the sensor function. For this purpose, the sensor front face must be pushed forward at least up to the center of the annular groove. This can prevent air bubbles from collecting in front of the sensor. Furthermore, this ensures that air introduced due to principle (i.e., from the compressed-air cleaning) is discharged as quickly and effectively as possible.

Figure 5:
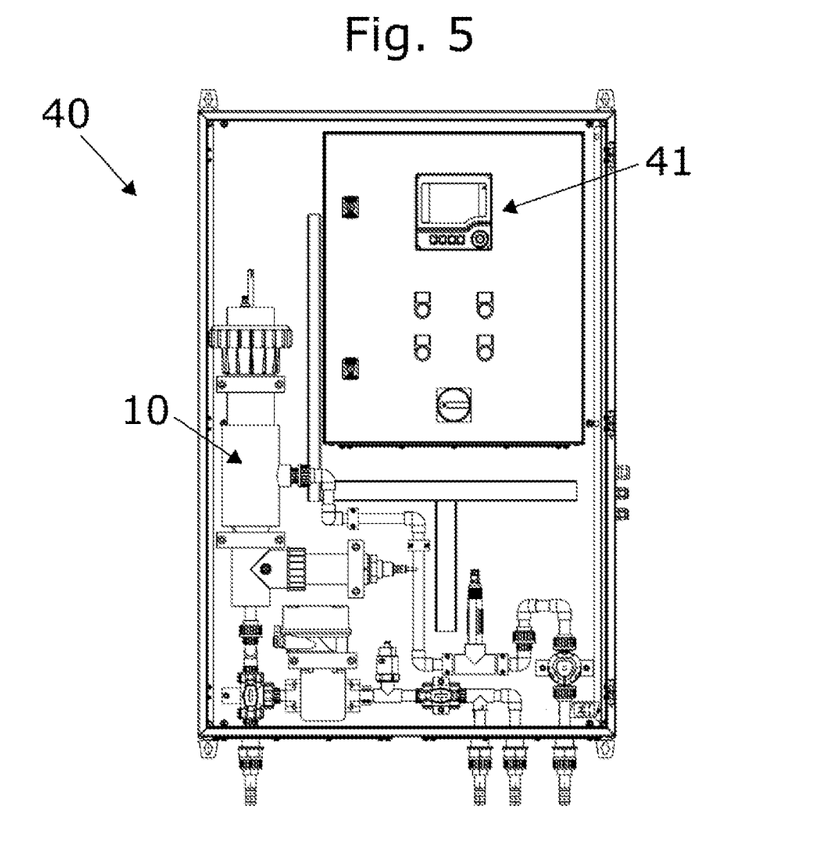
FIG. 5 shows a sensor holder with a transmitter in a protective cabinet.

The joint 2 enables easy disassembly of the sensor 20 with the union nut 3, even under restricted space conditions in protective housings 40, by the housing 11 together with the sensor 20 being folded downwards into the maintenance position. In FIG. 5, a transmitter 41 connected to the sensor 20 is visible in the protective housing 40, wherein the sensor 20 is in the measurement position in this figure.

For example, the following materials are selected: the housing 11 made of PE, the union nut 3 made of PE, the sealing element 6 made of PVDF, and the holding piece 4 made of PE.

Figure 2:
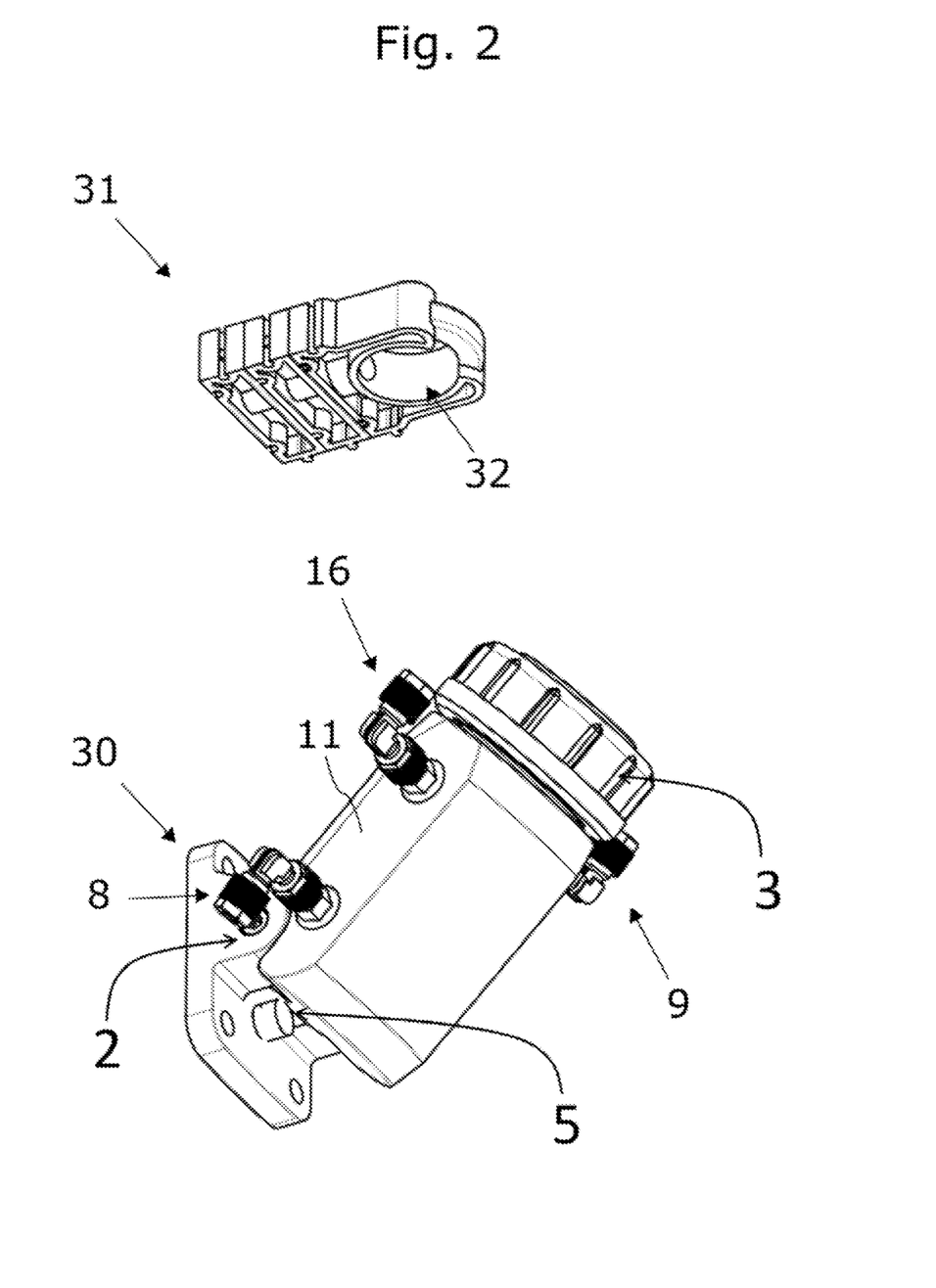
FIG. 2 shows the claimed sensor holder with a second wall holder.

FIG. 2 shows the sensor holder with the first and second wall holders 30, 31 (at the bottom/top in the figure). The sensor holder 10 comprises the second wall holder 31, which is designed to be fastened to a wall 42. The second wall holder 31 is arranged at an offset from the first wall holder 30, wherein the second wall holder comprises a receptacle 32, with locking or latching if necessary, for the flow sensor 20. The sensor 20 can be locked, e.g., clicked or latched, in the receptacle.

The first wall holder 30 comprises a buffer 5, which brakes a movement of the housing 11 from the measurement position into the maintenance position. The buffer, e.g., a rubber buffer 5, limits the angle of the longitudinal axis of the housing 11 relative to the vertical, such that the liquid from the interior 12 does not leak even in the maintenance position.

Figure 3:
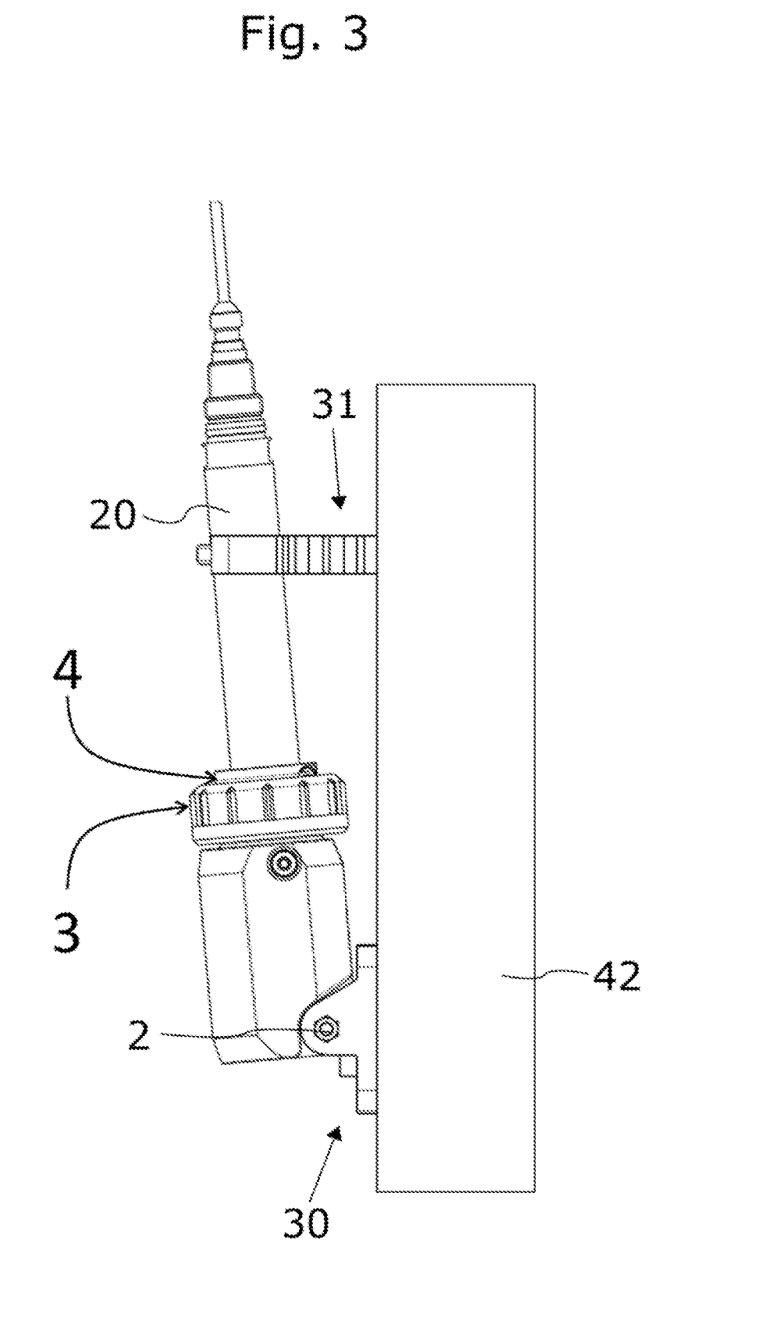
FIG. 3 shows the claimed sensor holder with a sensor in the measurement position.

FIG. 3 shows a sensor 20 installed in the sensor holder 10, wherein the two wall holders 30, 31 are fastened to the wall 42, in the measurement position.

Figure 9:
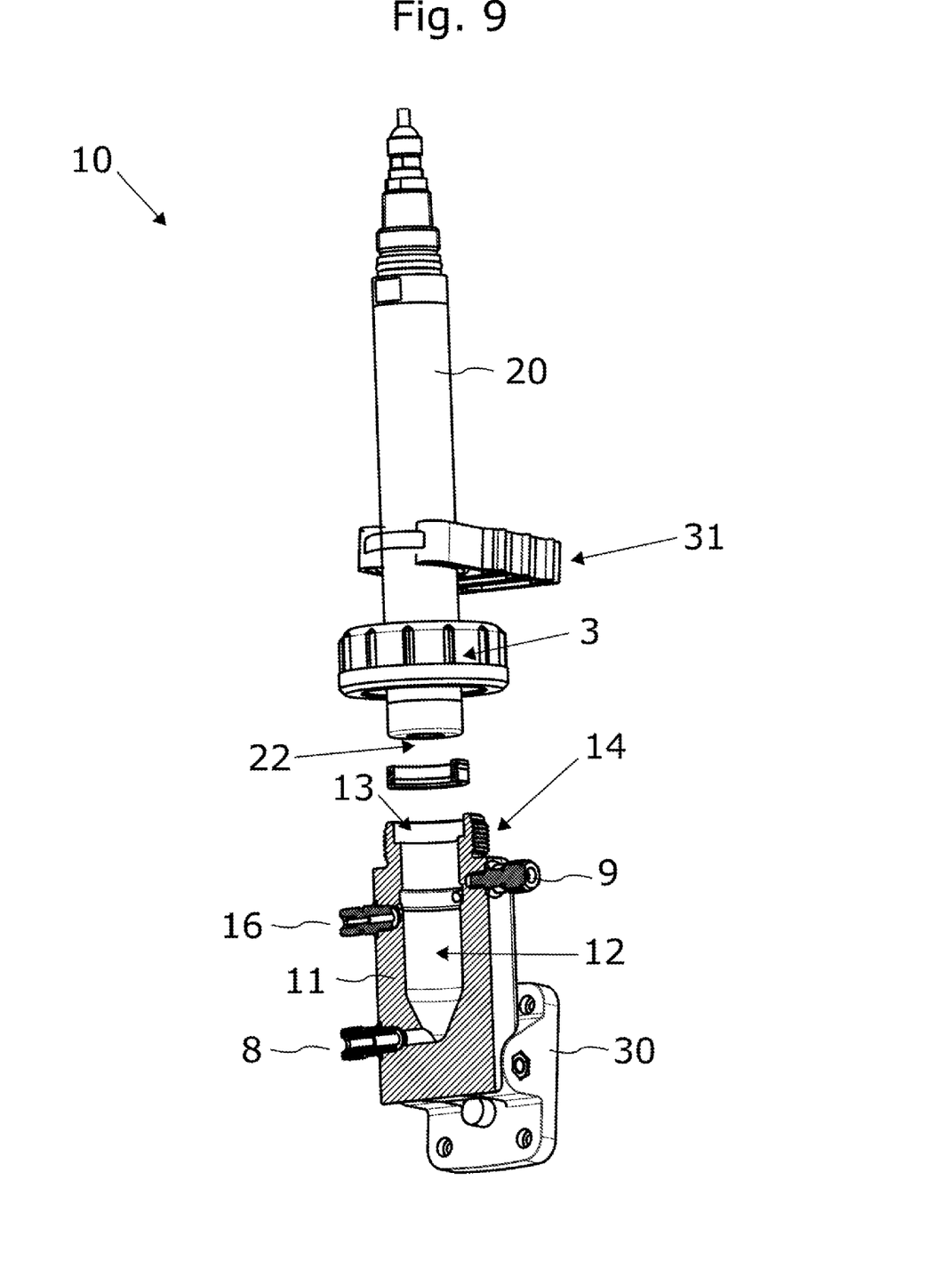
FIG. 9 shows the claimed sensor holder in an exploded view, partially in cross-section, with a second wall holder.

FIG. 9 shows the sensor holder 10 with the sensor 20, which is received in the second wall holder 31. The sensor 20 is enclosed by the union nut 3, which engages in the thread 14 during assembly and thus secures the sensor.

Figure 4:
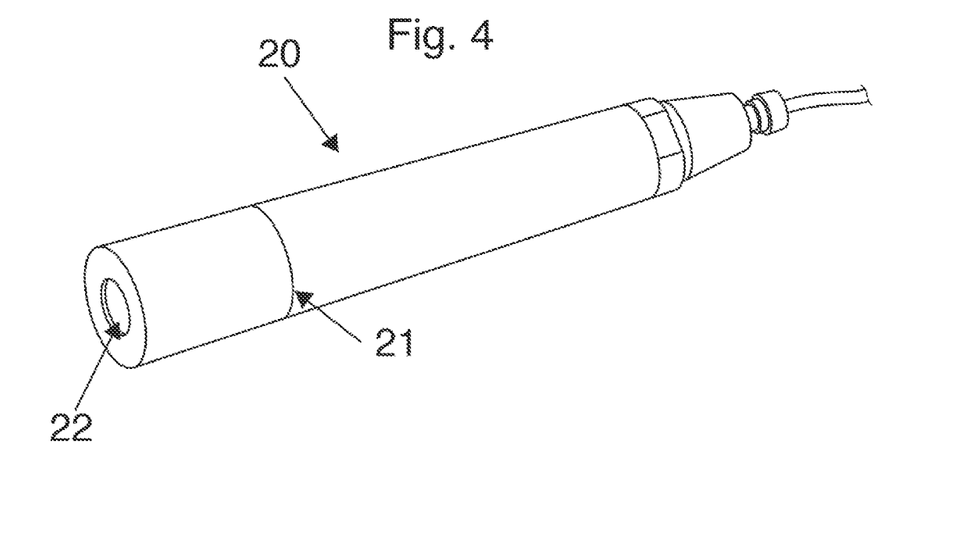
FIG. 4 shows a flow sensor.

The sensor 20 is discussed below; see FIG. 4 or FIG. 9. The sensor is, for example, an optical sensor, such as a fluorescence sensor, for determining the oil-in-water content, turbidity sensor, or oxygen sensor.

The sensor 20 comprises a light source. The light source radiates excitation light into the medium to be measured in the interior 20, wherein the excitation light is converted by the medium into fluorescent light. The fluorescent light is received by a photodiode and converted into a first signal. The photodiode measures the decay curve of the fluorescent light. Alternatively or additionally, the intensity of the fluorescence is measured directly after excitation. The decay time is determined via the decay curve. The decay time obtained is an integral value without spectral information. The feature, "determining the decay curve," is also to mean the determination of the decay time by measuring the phase shift in the case of periodic excitation. Alternatively or additionally, the fluorescent light can also be captured by a spectrometer. The spectrometer measures the spectrum of the fluorescent light and converts it into a second signal. The light source, the spectrometer, and the photodiode are with the transmitter 41, which determines the oil-in-water content of the sample from the first signal and/or the second signal. This concentration is determined by means of a calibration model which combines the measured information about decay times in discrete wavelength intervals and about fluorescence intensities, and determines the concentration therefrom. Additional information about the oil is included in the spectral distribution of the fluorescent light, its decay time, and its dependence upon the excitation wavelength.

The procedure for maintaining a sensor 20 can be as follows: First, the housing 11 is moved via the joint 2 from the measurement position into the maintenance position. In doing so, the sensor 20 is unclicked from the second wall holder 31 or released from the opening 32. If necessary, a clamp must be opened. If the sensor 20 (as well as the housing 11) is in the maintenance position, the fastening unit 3, i.e., the union nut, is released. Then, the sensor 20 is removed from the holder 10. The holding piece 4 can remain on the sensor 20. Finally, the sealing element 6 can be removed. Said sealing element is either cleaned or completely replaced, or one or both O-rings are replaced. This is followed by cleaning of the housing interior 12, and cleaning the first and/or second flushing openings 8, 9 and/or cleaning opening 16 if necessary. Since the sensor 20 is de-installed, cleaning the same and also the holding piece 4 is possible. The assembly finally takes place in reverse order, i.e., first the sealing element 6 is attached, then the holding piece 4 together with the flow sensor 20 is attached, the union nut is attached and tightened, and, finally, the housing 11 (i.e., of the sensor 20) is moved into the measurement position.

The invention claimed is:

1. A sensor holder for a flow sensor, comprising
a substantially cylindrical housing with a housing interior, including:
    an opening at a first front face, which is designed to receive the flow sensor,
    wherein the housing at the second front face is conical,
    a first flushing opening to the housing interior, which opening opens into the end region of the cone, and
    a second flushing opening to the housing interior,
a fastening unit, which is designed to fasten the flow sensor in the housing, and
a first wall holder, which is designed to be fastened to a wall,
wherein the first wall holder comprises a joint, which is connected to the housing in the region of the second front face, wherein the housing can be moved via the joint from a measurement position into a maintenance position.

2. The sensor holder of claim 1, comprising:
a second wall holder, which is designed to be fastened to a wall;
wherein the second wall holder is arranged at an offset from the first wall holder;
wherein the second wall holder comprises a receptacle for the flow sensor.

3. The sensor holder of claim 1, wherein the first wall holder comprises a buffer, which brakes a movement of the housing from the measurement position into the maintenance position.

4. The sensor holder of claim 1, wherein the first wall holder with the joint, with the second wall holder, is designed such that the longitudinal axis of the housing is arranged at an angle of ≥5° between 5° and 20° to the vertical.

5. The sensor holder of claim 1, including:
a cleaning opening to the housing interior, which opening is arranged such that it is directed onto the sensitive region of the flow sensor in the installed state thereof.

6. The sensor holder of claim 1, wherein the fastening unit is a union nut, and the housing has a corresponding external thread in the region of the first front face.

7. The sensor holder of claim 1, including:
a holding piece, which is designed to be fixed to or around the flow sensor,
wherein the holding piece is designed to be attached to the housing at the first front face,
wherein the fastening unit engages in the holding piece and prevents a movement of the flow sensor installed in the sensor hold.

8. The sensor holder of claim 1, wherein the holding piece comprises a collar, wherein the union nut is supported on the collar, thereby pressing the holding piece onto the housing and preventing a movement of the flow sensor.

9. The sensor holder of claim 1, includes:
a sealing element, which is designed to prevent a flow of medium from the housing interior to the outside,
    wherein the housing has a groove in the region of the first front face, into which groove the sealing element can be inserted.

10. The sensor holder of claim 1, wherein the sealing element is annular and comprises a first O-ring on its inner side and a second O-ring on its outer side.

11. The sensor holder of claim 1, whrein the flow sensor for determining the oil-in-water content, turbidity sensor, oxygen sensor.

12. A method for maintaining a flow sensor in a sensor holder according to one of the preceding claims, comprising the following steps:
- moving the housing via the joint from the measurement position into the maintenance position,
- releasing the fastening unit;
- removing the holding piece with the flow sensor attached thereto from the housing interior;
- removing the sealing element;
- cleaning or replacing the sealing element;
- cleaning the housing interior, and cleaning the first and/or second flushing openings;
- cleaning the holding piece and cleaning the flow sensor;
- attaching the sealing element;
- attaching the holding piece together with the flow sensor;
- attaching the fastening unit; and
- moving the housing into the measurement position.

\* \* \* \* \*